United States Patent [19]
Eul et al.

[11] Patent Number: 5,137,411
[45] Date of Patent: Aug. 11, 1992

[54] APPARATUS AND METHOD FOR TRANSPORTING MOTOR SCOOTERS AND THE LIKE ON A MOTOR VEHICLE

[76] Inventors: Joseph J. Eul, 2706 E. Larkspur; David G. Leeper, 2518 E. Larkspur, both of Phoenix, Ariz. 85032

[21] Appl. No.: 517,933
[22] Filed: May 2, 1990
[51] Int. Cl.⁵ .............................................. B60P 3/06
[52] U.S. Cl. ................................ 414/462; 224/42.08; 414/541; 414/786
[58] Field of Search ................... 224/42.08; 414/462, 414/541, 557, 921, 786; 187/8.47, 8.49, 8.52, 9 R

[56] References Cited

U.S. PATENT DOCUMENTS

| | | | |
|---|---|---|---|
| 4,664,584 | 5/1987 | Braun et al. | 414/541 |
| 4,705,448 | 11/1987 | Mungons | 224/42.08 X |
| 4,741,660 | 5/1988 | Kent | 414/462 |
| 4,775,282 | 10/1988 | Van Vliet | 414/462 |
| 5,011,361 | 4/1991 | Peterson | 414/462 |

Primary Examiner—Robert J. Spar
Assistant Examiner—Janice Krizek
Attorney, Agent, or Firm—William W. Holloway

[57] ABSTRACT

Apparatus and a method are disclosed for transporting a motor scooter or similar type vehicle on the back of a motor vehicle such as an automobile, van, pick-up truck or the like. The apparatus of the present invention attaches to the rear of the motor vehicle and includes a platform which, when not in use, is oriented in a vertical direction. When the apparatus is used to transport a motor scooter, the platform is lowered to the ground and the motor scooter can be loaded onto the platform. A restraining bar is used to secure the scooter to the platform. The platform, still with the horizontal orientation, is raised to prevent contact with the ground when the motor vehicle is in motion. To remove the motor scooter, the platform is lowered to the ground, the lowering of the platform causing the restraining bar to be released. The motor scooter can then be removed from the platform and the platform secured in a vertical orientation until required further. The platform is configured to permit motor scooters having different wheel configurations to be carried thereon.

12 Claims, 3 Drawing Sheets

APPARATUS AND METHOD FOR TRANSPORTING MOTOR SCOOTERS AND THE LIKE ON A MOTOR VEHICLE

BACKGROUND OF THE INVENTION

1. Field of the Invention

This invention relates generally to the convenient transportation of small motorized scooters and similar vehicles, vehicles that are too heavy or too bulky for easy manipulation, by a larger motor vehicle such as an automobile or van.

2. Description of the Related Art

In response to the needs of persons of impaired mobility, a variety of small motorized scooters and vehicles have been developed which can be used to carry a seated person. These motorized vehicles are sufficiently small and maneuverable to permit a person of otherwise limited mobility to shop and to be transported through regions normally suitable only for pedestrian traffic, thereby permitting a heretofore unavailable freedom and independence.

These small motorized scooters have a severely limited range, being powered by a battery. Similarly, the speed of these vehicles is limited, generally for reasons of safety. In order to increase the usefulness of the motor scooters, carrying apparatus or transporter units have been devised that can be coupled to a motor vehicle. The carrying apparatus permits the motor scooter to be loaded thereon, transported by the motor vehicle to a predetermined location, unloaded from the motor vehicle and used for local transportation. The transporter unit typically has a platform that can be lowered to the ground for loading and unloading the motor scooter and the platform can be raised during the actual transporting of the motor vehicle. In addition, the platform can typically be raised into a vertical or stowed position when the motor vehicle is in use, but is not transporting a motor scooter.

In the past, the transporter units have been designed for particular motor scooter configurations. In addition, the transporter units were difficult to operate for persons with less than normal motor skills. The transporter units also provided the opportunity for inadvertent damage to the motor scooter when an attempt was made to place the transporter unit in the stowed configuration with a motor scooter secured to the transporter unit.

A need has therefore been felt for a transporter unit for the transport of motor scooters and similar vehicles which can be operated with minimum motor skills, which can minimize opportunity for damage to the motor scooter, and which can be used in the transport of motor scooters and the like having a plurality of configurations.

FEATURES OF THE INVENTION

It is an object of the present invention to provide a transporter unit for the transport of motor scooters and the like which can coupled to a motor vehicle.

It is a feature of the present invention to provide a transporter unit for the transport of motor scooters and the like which can accommodate a multiplicity of types of motor scooter configurations.

It is another feature of the present invention to provide a transporter unit for motor scooters and the like which has a platform that can be moved to a vertical orientation when not used in the transport of motor scooters.

It is yet another feature of the present invention to provide a lever mechanism for positioning a platform in a vertical position that can minimize the possibility of orienting the platform to the vertical position when a motor scooter is positioned on the platform.

It is a further feature of the present invention to provide a transporter unit for motor scooters and the like which includes apparatus for securing vehicles of arbitrary configuration to the transporter unit.

It is a still further feature of the present invention to require a positive action by an operator in order to cause a change in configuration of the transporter unit.

SUMMARY OF THE INVENTION

The aforementioned and other features are attained, according to the present invention, by providing a transporter unit which can be detachably coupled to a motor vehicle hitch apparatus. The transporter unit includes a platform which can be raised or lowered by activation of a motor. A lever is used to control whether the platform will be raised in a horizontal orientation, thereby permitting a motor scooter to be transported thereon, or, during the course of raising the platform, the platform will be rotated into a vertical orientation suitable for travel when a motor scooter is not being transported by the motor vehicle. The rotation of the platform of the transporter unit into a vertical or stowed position is accomplished only by a positive activity by the operator, minimizing the risk of inadvertent damage to the motor scooter. When the transporter unit is configured to transport a motor scooter, a bar is used to secure the motor scooter to the platform. The transporter unit is adapted to be operated by a person of moderate motor skills.

These and other features of the invention will be understood upon reading of the following description along with the drawings.

DESCRIPTION OF THE PREFERRED EMBODIMENT

1. Detailed Description of the Figures

Figure 1:
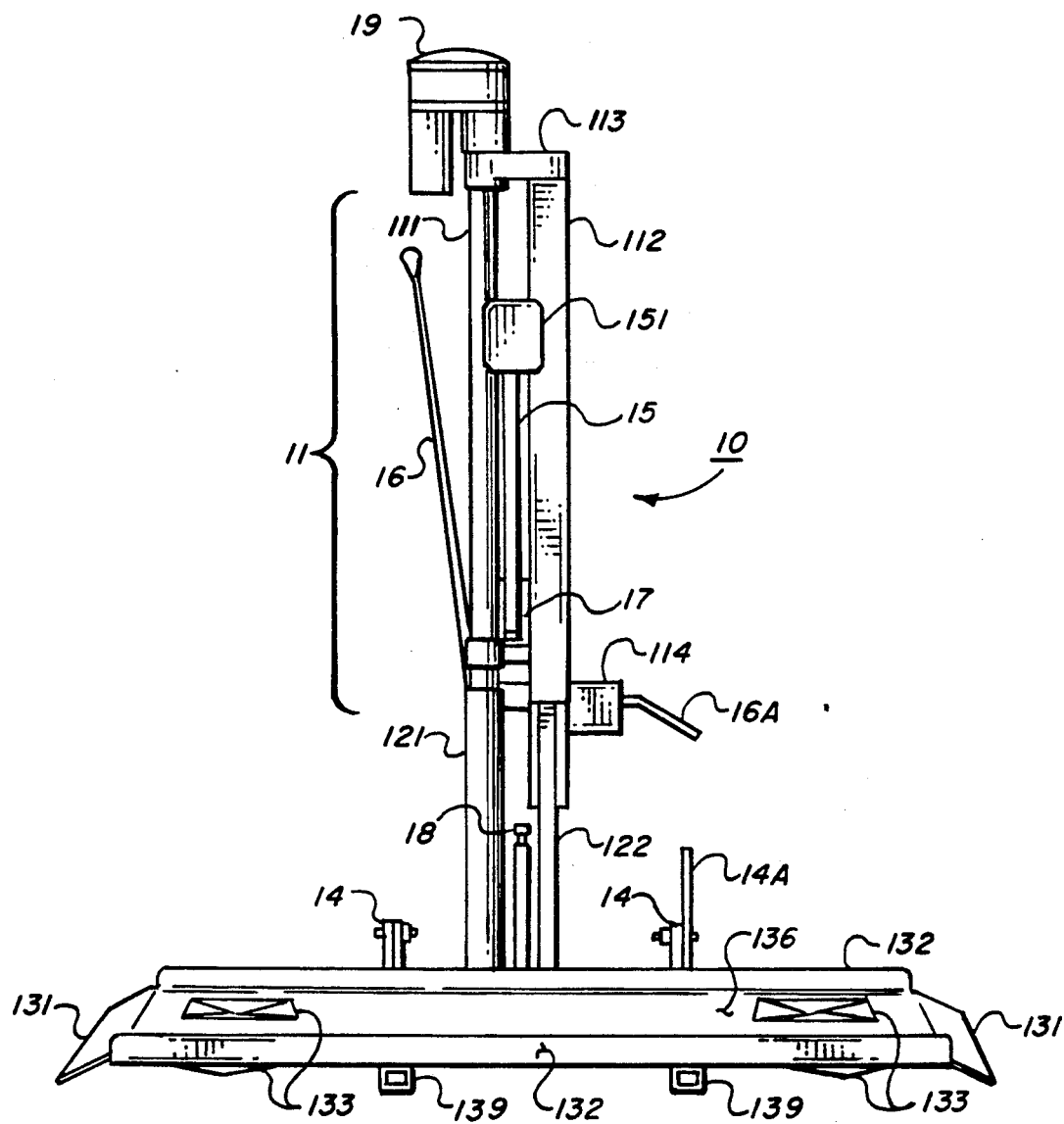
FIG. 1 is a perspective view of the transporter unit for motor scooters and the like as viewed from the rear of the vehicle to which the transporter unit is attached.

Referring now to FIG. 1, a perspective view of the motor scooter transporter unit 10 is shown. The transporter unit 10 includes an upper portion 11 having two hollow tubes 111 and 112 and a lower portion 12, the lower portion 12 having two rods 121 and 122 inserted in tubes 111 and 112, respectively. Coupling members 113 and 114 provide structural integrity between the hollow tube members 111 and 112. In addition, coupling member 114 has the apparatus for coupling the transporter unit to the carrying vehicle. The use of two upper portion members 111 and 112 and two lower portion members provides structural integrity against rotation for transporter unit 10. Platform 13 is rotatably coupled to the lower portion 12 of the transporter unit, the platform 13 is constrained to rotate between a horizontal orientation (shown in FIG. 1) and a vertical orientation, the vertically oriented platform being proximate the upper portion 11 and the lower portion 12 of the transporter unit 10. A motor is mounted on the upper portion 11 of the transporter unit and engages at least lower portion member 121 for raising and lowering the lower portion 12 of the transporter unit (and the coupled platform). The motor 4 is electrical and is energized through a connection (not shown) to the battery of the vehicle to which the transporter unit is attached. The motor 4 moves the transporter unit lower portion 12 by means of a worm gear in the preferred embodiment, although other mechanisms can be employed for converting the rotation of the motor into linear motion of the transporter unit lower portion 12.

The platform 13 has lips 131 on either side to facilitate the loading or unloading of the motor scooter (from the left and from the right of the illustrated platform) when the platform 13 is in contact with the ground. The platform 13 has walls 132 in the front and back of the platform to help secure the motor scooter during travel. In addition, the surface of platform 13 has a plurality of wells 133 fabricated therein into which at least on wheel of the motor scooter being transported can be positioned. In combination with the engagement member 15, these wells in the platform surface prevent motion of the motor scooter during transport.

Figure 2A:
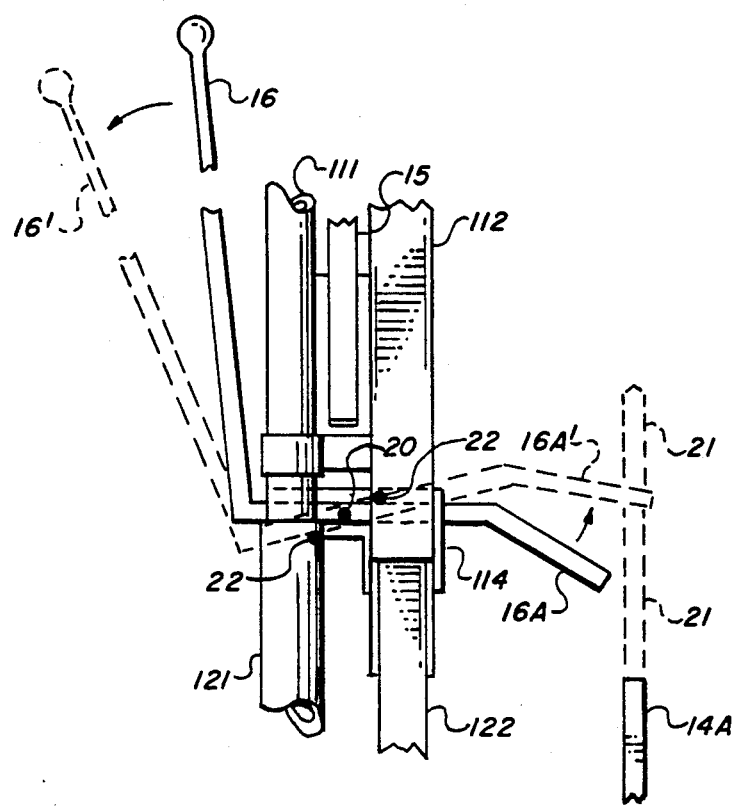
FIG. 2A illustrates the operation of the lever controlling the orientation of the transporter unit platform.

Lever 16 is pivoted about structural member 114. In the absence of an external force, the lever 16 assumes the position shown and, in this position, does not influence the orientation of the platform 13 when the lower portion 12 of the transporter unit 10 is raised. When the top of lever 16 is pulled to the left (as seen in FIG. 2A), the pivoted bottom portion of the lever is brought into the path of hinge projection 14A. As the platform 13 is raised, the hinge projection 14A comes in contact with the lower end 16A of the lever. The pivoting of lever 16 is constrained by structure in the member 114. The projection 14A, unable to travel upward further when in contact with lever end 16A, causes the platform to rotate about an axis determined by hinges 14. The lever 16 and the projection 14A are positioned in such a manner that the platform 13 is in the full vertical position when the lower portion 12 of the transporter unit is at the highest vertical travel.

Engagement member 15 is held in the position, illustrated in FIG. 1, by a magnet (not shown) attached to at least one of the upper portion members 111 and 112. The engagement member 15, when removed from the magnet, pivots about axis 17 and extends over the platform 13. When the platform 13 is raised with a motor scooter thereon, the upper portion of the engagement member 15 contacts the motor scooter and, as the platform is raised, the upper portion of engagement member 15 is raised. Conversely, the engagement member lower portion 15A, extending behind upper portion members 111 and 112, is lowered. However, extension member 18, attached to transporter unit lower portion 12, is raised and engages the lower portion of engagement member 15A. The extension member 18, acting on the lower portion of engagement member 15, and the motor scooter, acting on the top of engagement member 15, exert forces attempting to rotate engagement member 15 in opposite directions, the result being a net force opposing the raising of the platform 13. The motor 4 raising the platform 13 is in the preferred embodiment provided with a clutch mechanism. When the force exerted by the motor scooter and the extension member 18 reaches a sufficiently large value, the clutch will start to slip. At this point, the operator can deactivate the motor 4 and the engagement member 15, exerting a force on the motor scooter, will prevent the motor scooter from slipping on the platform 13.

Figure 2B:
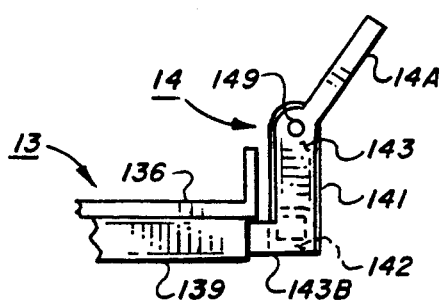
FIG. 2B illustrates the horizontal orientation of the transporter unit platform.
Figure 2C:
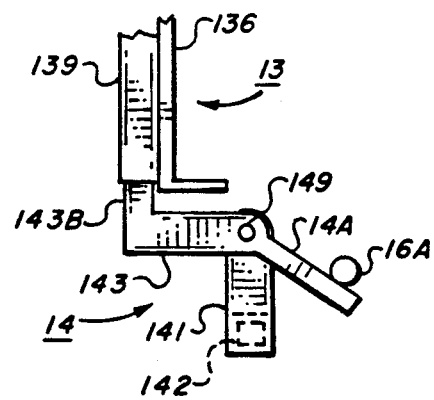
FIG. 2C illustrates the stowed orientation of the transporter unit platform.

Referring next to FIG. 2A, the operation of the lever 16, which determines whether the platform 13 will rotate into the vertical position when the transporter unit lower portion 12 is raised, is illustrated. As in FIG. 1, the transporter unit upper portion 11 includes the upper portion tube members 111 and 112 held in relative alignment by the coupling member 114. The lever 16 is shown pivoting about point 20. As will be clear, a more complex lever member can be used, but the operation of the lever is illustrated by use of pivot point 20. In the equilibrium position of the lever, the path 21 of hinge extension member 14A, when the transporter lower unit 12 is raised, does not coincide with the lever arm lower portion 16A. When a force is exerted on lever 16 and the lever is moved into position 16', the path 21 of the hinge extension member 14A does coincide with the bottom of the lever arm 16A' in the new position. The areas indicated by 22 are mechanical stops for limiting the range of motion possible to the lever 16. In FIG. 2B and FIG. 2C, the operation of the hinges 14, acting in conjunction with lower lever arm portion 16A, is shown. The hinges 14 include a first member 141, attached to a connecting member 142 which is attached to the transporter unit lower portion members 121 and 122 and a second member 143 rotatably coupled to to the first member 141 at pivot point 149. The second member 143 includes an hinge extension member 14A which, when lever 16 is moved to the stowed platform position, engages lever extension 16A. The second hinge member 143 also includes extension 143B, the extension 143B being coupled to structural tubing 139, the structural support tubing providing structural integrity for the platform surface 136. In the horizontal orientation shown in FIG. 2B, the platform is horizontal prior to the moment when the upward moving transporter unit lower portion 12 causes hinge extension member 14A to contact lever lower portion 16A. The lever lower portion 16A, being constrained by mechanical stops, is fixed, causing hinge member 143 to rotate relative to hinge member 141. The result of the rotation of the second hinge member 143 is to bring the platform into a vertical or stowed orientation shown in FIG. 2C. Unless the lever 16 is forced into the position in which contact is made between hinge extension member 14A and lower lever portion 16A, the platform 13 will remain in the horizontal orientation when the transporter unit lower portion 12 is raised.

Figure 3:
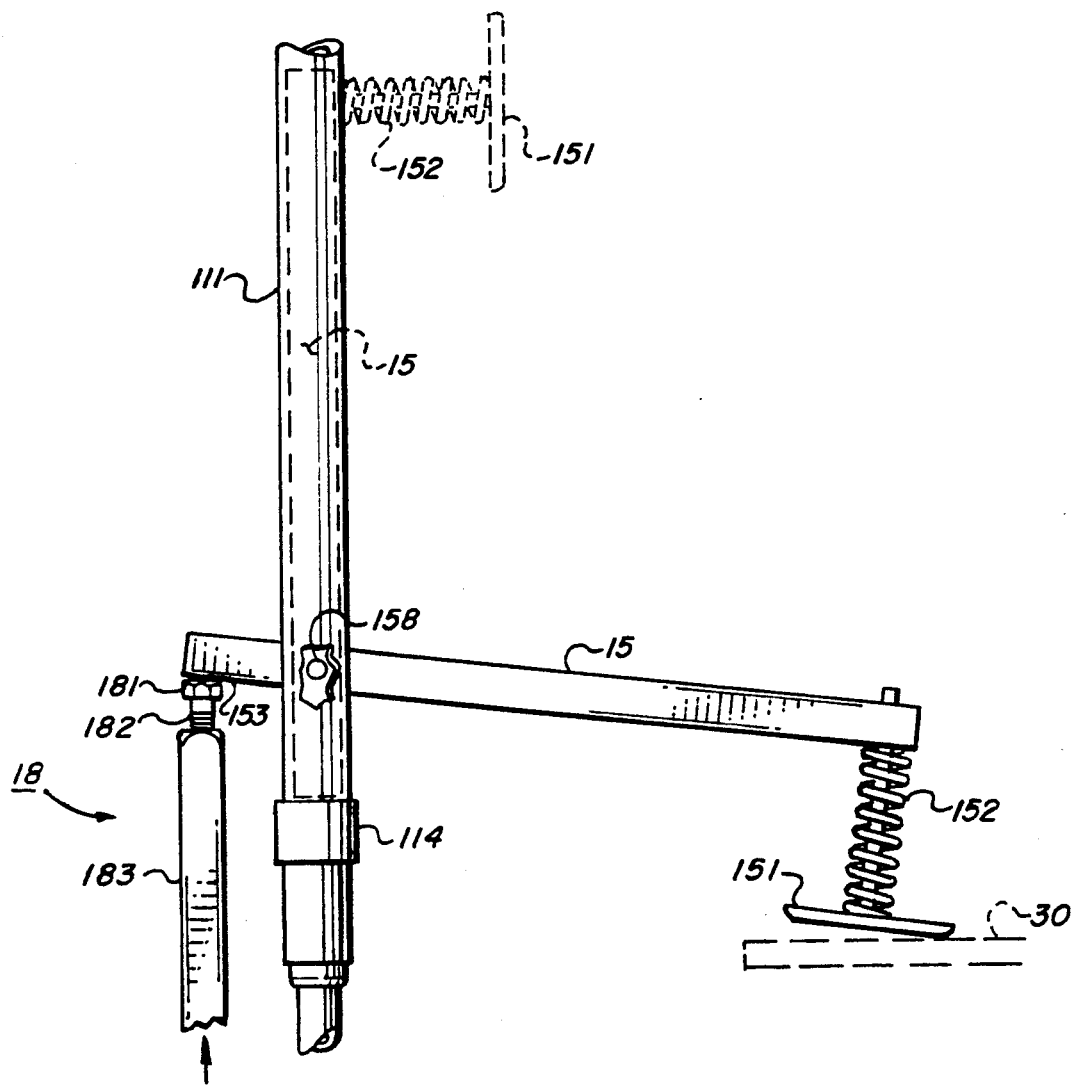
FIG. 3 illustrates the operation of the apparatus for securing a motor scooter on a transporter unit of the present invention.

Referring next to FIG. 3, the operation of the engagement member 15 is shown from a different perspective. Engagement member 15 includes a pad 151 coupled to the main body of the engagement member 15 by a spring loaded extension arm 152. The engagement member 15 is oriented in the vertical position when a motor scooter is not being transported by the transporter unit 10 and is pivoted about a pivot point 158 into a generally horizontal orientation when a motor scooter is being transported. The pivot point 15 is fixed with respect to the transporter unit upper portion 11. As the motor scooter 30 is raised on the platform, the pad 151 contacts a portion of the motor scooter 30, typically the seat. As the platform (along with the motor scooter) is raised, the contact of the pad 151 with the motor scooter 30 causes the portion 153 of the engagement arm on the other side of the pivot point 158 to be lowered. As the platform 13 is raised, the extension member 18, coupled to the transporter unit lower portion 12, is also raised. The extension member 18 includes a contact pad 181, an adjustment screw 182 and a body member 183. As the platform is raised, the extension member contact pad 181 engages the engagement member portion 153. Because the forces on the engagement member 15 are on opposite sides of the pivot point, the transporter unit lower portion 12 will be opposing the transporter unit upper portion 11. In the preferred embodiment, the motor 4 has a clutch which will slip when sufficient force is exerted thereon. When the clutch starts to slip, the motor can be deactivated and the motor scooter 30 will be held in place by the engagement member 15.

Figure 4:
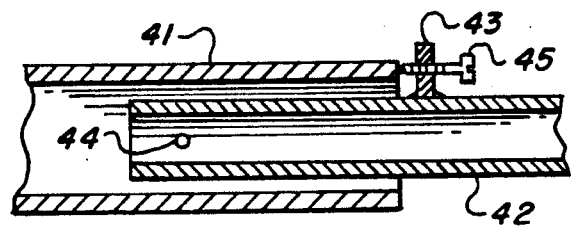
FIG. 4 is a cross sectional view of the vehicle hitch and the apparatus for coupling the transporter unit to the vehicle hitch according to the present invention.

Referring to FIG. 4, a cross-sectional view of the apparatus securing the transporter unit 10 to the automobile according to the present invention is shown. Tube 41 is part of a Class 3 hitching unit coupled to the motor vehicle to which the transporter unit 10 is attached. The tube (or rod) 42 is coupled to the transporter unit upper portion 11 and is inserted in the tube 41. Typically, the motor vehicle and the attached transporter unit are secured by pin 44 extending through both members. In the present invention, a member 43 is mounted on the tube (or rod) 42 and a set screw 45 tightened against a wall of tube 41. The combination of the pin 44 and the set screw 45 minimizes the vibrations which might otherwise damage portions of the motor vehicle.

2. Operation of the Preferred Embodiment

The present invention is intended to to be used by persons with less than perfect motor skills and reflexes. The operation is relatively simple. The motor which operates the transporter unit can be activated by a switch, although a key is typically employed to prevent unauthorized use. The lever for stowing the platform is easy to reach and to use. The platform of the transporter unit is adapted to permit motor scooters to be loaded and unloaded on either side of the platform, minimizing the problems in finding a suitable parking space for unloading the motor scooter.

In the preferred embodiment, the lever 16 is weighted in such a manner that, in the absence of the a force exerted thereon, the upward travel of the hinge projection 14A will not engage the lever end 16A. This feature prevents inadvertent changing of the platform into the vertical or stowed position when a motor scooter is present thereon. In order to change the platform from the motor scooter carrying orientation to the stowed orientation, a positive effort must be made, i.e., a force must be exerted on the lever 16 to remove the lever from the equilibrium position.

The motor scooter is held on the platform during the transporting thereof by the positioning of at least one wheel in a platform well and the force exerted by the engagement member. The engagement member has adjusting apparatus and spring apparatus to provide for motor scooters in a variety of sizes. The clutch feature of the coupling between the motor and the lower transporter unit portion insures that an appropriate force will be provided to minimize slippage of the motor scooter on the platform. In addition, the clutch mechanism prevents damage to the motor scooter and/or to the transporter unit in the event that the engagement member contacts an unplanned portion of the motor scooter.

The motor scooter, having the elements of an electrically operated vehicle, can be damaged by excessive vibration. The technique for coupling the transporter unit to the hitch reduces the vibration. In addition, the more secure coupling to the hitch by the transporter unit minimizes the swaying that can result in the inadvertent slippage of the motor vehicle.

In the preferred embodiment, the motor is activated by a spring-loaded switch or a spring-loaded key mechanism, the loading being such that the motor will not operate, i.e., the platform will remain fixed, unless a force is exerted on the switch or key mechanism. The need for a continuously acting force during the raising or the lowering of the platform is included to prevent accidents resulting from undesired motion of the platform.

The foregoing description is included to illustrate the operation of the preferred embodiment and is not meant to limit the scope of the invention. The scope of the invention is to be limited only by the following claims. From the foregoing description, many variations will be apparent to those skilled int he art that would yet be encompassed by the spirit and scope of the invention.

What is claimed is:

1. A transporter unit for carrying motor scooters on a motor vehicle, said transporter unit comprising:
   a motor;
   a frame unit including an upper and a lower portion, said upper portion having an attachment mechanism for coupling said frame unit to said motor vehicle, said upper portion having said motor connected thereto, said lower portion slidably mounted to said upper portion;
   a coupling between said motor and said lower portion, said lower portion being raised and lowered relative to said upper portion in response to activation of said motor;
   a platform rotatably coupled to said lower portion, said lower portion capable of being lowered to permit said platform to contact a ground region, said platform having a horizontal orientation when lowered to said ground region;
   a lever weighted to be held in a first position, said platform remaining in said horizontal orientation when said lower portion is raised and said lever is in said first position, wherein said platform includes a projection, said lever engaging said projection when said lever is held in a second position and said lower portion is raised, said platform being rotated into a vertical orientation when said lower portion is raised while said lever engages said projection; and
   a mechanism for securing a motor scooter positioned on said platform when said lower portion is raised, wherein said securing mechanism is rotatably coupled to said upper portion, said securing mechanism engaging said motor scooter and a projection member coupled to said lower portion with increasing force as said lower portion is raised, and wherein said coupling between said motor and said lower portion includes a clutch, said clutch slipping when a force between said securing mechanism and said motor scooter exceeds a predetermined amount.

2. The transporter unit of claim 1 wherein said platform includes structure permitting motor scooters to be loaded thereon from either side when said platform is positioned on the ground region.

3. The transporter unit of claim 2 wherein said platform has indentations for engaging wheels of a motor scooter positioned on said platform.

4. The transporter unit of claim 1 further comprising an attachment mechanism for coupling said frame unit to a motor vehicle hitch, said attachment mechanism including:
 a coupling member for insertion in the motor vehicle hitch and having an aperture for receiving a coupling pin; and
 a mounting member having a threaded aperture proximate said motor vehicle hitch when said frame unit is coupled thereto, wherein a set screw in said threaded aperture engages said motor vehicle hitch.

5. A method of transporting a motor scooter on a motor vehicle, the method comprising the steps of:
 positioning a platform of a motor scooter transporter unit proximate a ground region for loading and unloading said motor scooter;
 when said transporter unit is to be placed in a stowed configuration, moving a lever normally in a first configuration to a second configuration;
 actuating a motor to raise said platform while said lever is in said second configuration, the combination of said lever in said second configuration and raising said platform causing said platform to rotate into a vertical position;
 when said transporter unit is to transport a motor scooter positioned on said platform, rotating an engagement arm into contact with said motor scooter and raising said platform, the combination of said engagement arm in contact with said motor scooter and raising said platform causing said engagement arm to apply a force on said motor scooter securing said motor scooter to said platform; and
 causing a clutch of said motor to slip when the force between said engagement arm and said motor scooter exceeds a predetermined value.

6. The method of transporting a motor scooter of claim 5 further comprising a step of positioning at least one wheel of said motor scooter in a well formed in said platform.

7. The method of transporting a motor scooter of claim 5 wherein said lever is biased to remain in said first configuration in the absence of an external force.

8. The method of transporting a motor scooter of claim 5 further comprising the step of securing said transporter unit to a hitch of said motor vehicle using a set screw coupled to said transporter unit.

9. A transporter unit for transporting a motor scooter on a motor vehicle, said transporter unit comprising:
 a platform for carrying said motor scooter, said platform including wells into which at least one wheel of a motor scooter is inserted;
 a motor for controlling raising and lowering said platform, wherein said platform is lowered to a ground level for loading and unloading said motor scooter;
 rotation apparatus including a lever, said rotation apparatus causing said platform to rotate into a vertical orientation when said lever has an external force applied thereto and said platform is being raised, wherein said rotation apparatus includes a hinge extension coupled to said platform, said hinge extension engaging a portion of said lever when said lever has said external force applied thereto and said platform is being raised; and
 engagement mechanism for exerting a force on said motor scooter when said platform is being raised, wherein said motor includes a clutch unit, said clutch unit being adapted to slip when the force between said engagement mechanism and said motor scooter exceeds a predetermined value.

10. The transporter unit of claim 9 wherein said transporter unit is coupled to a hitch apparatus of said motor vehicle, said transporter unit including a threaded aperture positioned to permit a set screw to secure said transporter unit relative to said hitch apparatus.

11. The transporter unit of claim 9 wherein said transporter unit includes an upper portion having said motor attached thereto and a lower portion having said platform attached thereto, wherein said upper portion has two tubes and said lower portion has two members for being slidably inserted in said two tubes.

12. The transporter unit of claim 11 wherein said engagement mechanism is coupled to said upper portion and exerts a force on said lower portion in addition to said force on said scooter when said platform is raised.

* * * * *